US008616846B2

(12) United States Patent
Nanukuttan et al.

(10) Patent No.: US 8,616,846 B2
(45) Date of Patent: Dec. 31, 2013

(54) APERTURE CONTROL SYSTEM FOR USE WITH A FLOW CONTROL SYSTEM

(75) Inventors: Biju Nanukuttan, Jabalpur (IN); Stefan Herr, Greenville, SC (US); Afroz Akhtar, Bangalore (IN); EswaraRao Vsj Anjuri, Vishakhapatnam (IN); Wouter Haans, Den Haag (NL)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 13/324,001

(22) Filed: Dec. 13, 2011

(65) Prior Publication Data

US 2012/0134812 A1    May 31, 2012

(51) Int. Cl.
    *F03D 7/02*    (2006.01)
(52) U.S. Cl.
    USPC .................... 416/1; 416/90 R; 416/231 A
(58) Field of Classification Search
    USPC ............ 415/1, 194; 416/31, 90, 90 A, 90 R, 416/231 R, 231 A, 1
    See application file for complete search history.

(56) References Cited

U.S. PATENT DOCUMENTS

| | | | | |
|---|---|---|---|---|
| 1,501,248 A | * | 7/1924 | Strong | 416/1 |
| 5,403,158 A | * | 4/1995 | Auxier | 416/97 R |
| 5,938,404 A | * | 8/1999 | Domzalski et al. | 416/91 |
| 6,629,674 B1 | * | 10/2003 | Saddoughi et al. | 244/207 |
| 6,648,599 B2 | | 11/2003 | Preissler | |
| 7,387,491 B2 | | 6/2008 | Saddoughi et al. | |
| 7,883,313 B2 | | 2/2011 | Nies et al. | |
| 7,909,575 B2 | * | 3/2011 | Barbu et al. | 416/61 |
| 8,016,560 B2 | * | 9/2011 | McGrath et al. | 416/91 |
| 8,425,190 B2 | * | 4/2013 | Wu et al. | 416/31 |
| 2007/0231151 A1 | * | 10/2007 | Herr et al. | 416/229 A |
| 2010/0076614 A1 | | 3/2010 | Nies et al. | |
| 2010/0104436 A1 | | 4/2010 | Herr et al. | |
| 2010/0135795 A1 | * | 6/2010 | Nies et al. | 416/1 |
| 2010/0143122 A1 | | 6/2010 | Nies et al. | |
| 2010/0143123 A1 | | 6/2010 | Haans et al. | |

OTHER PUBLICATIONS www.cedrat.com "Micro Piezo Actuators", Cedrat Technologies, France, 2 pages.

* cited by examiner

*Primary Examiner* — Nathaniel Wiehe
*Assistant Examiner* — Woody A Lee, Jr.
(74) *Attorney, Agent, or Firm* — James McGinness; Armstrong Teasdale LLP

(57) ABSTRACT

An active flow control system for use with a wind turbine is provided. The wind turbine includes at least one blade. The active flow control system includes an air distribution system at least partially defined within said at least one blade. The air distribution system includes at least one aperture defined through the at least one blade. An aperture control system is in operational control communication with the air distribution system. The aperture control system includes an actuator at least partially positioned within the at least one blade and configured to control a flow of air discharged through the at least one aperture.

14 Claims, 13 Drawing Sheets

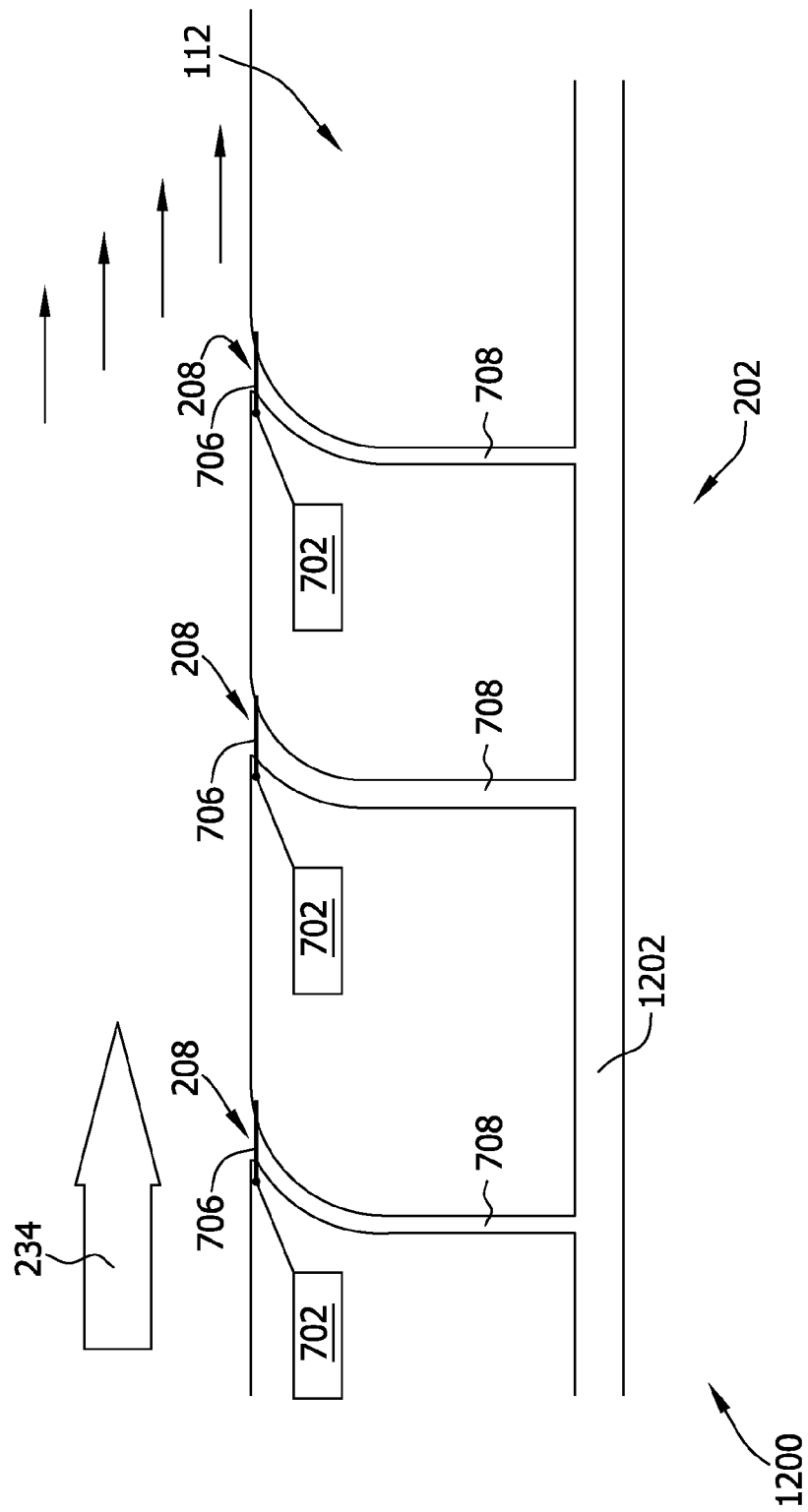

APERTURE CONTROL SYSTEM FOR USE WITH A FLOW CONTROL SYSTEM

BACKGROUND OF THE INVENTION

The embodiments described herein relate generally to a flow control system for use with a wind turbine and, more particularly, to a flow control system having an aperture control system.

Active flow control (AFC) is a general term for technologies and/or systems that actively attempt to influence an aerodynamic response of an object in reaction to given in-flow conditions. More specifically, at least some known AFC systems are used to manipulate flow conditions across an airfoil. As used herein, the term "airfoil" refers to a turbine blade, a wing, and/or any other suitable airfoil. Although the embodiments described herein refer to a turbine blade, it should be understood that the embodiments described herein may be used with any suitable airfoil. In contrast to known passive flow control systems that provide substantially constant flow control, known AFC systems enable flow control to be selectively applied to an airfoil.

At least some known AFC systems use air distribution systems to manipulate a boundary layer of air flowing across a surface of an airfoil. For example, AFC systems discharge air into the boundary layer to reduce skin friction between a flow across the blade and a surface of the blade. Known AFC systems include actuators that can be divided in two categories, depending on their net-mass-flow. The first category is zero-net-mass-flow actuators, such as synthetic jet actuators, and the second category is nonzero-net-mass-flow actuators, such as air ejection actuators, which may be steady or unsteady and/or blowing and/or suction actuators.

Some known AFC systems can cause boundary layer blow-off by discharging air with such force that the AFC air flow blows through the boundary layer and creates drag at the point of discharge. Such discharged air generally does not return into a near wall region to provide skin friction reduction until far downstream from the discharge point. As such, a relatively large amount of air is required to be discharged from the AFC system because a relatively large fraction of the AFC air flow does not flow along the near wall region to reduce skin friction.

Further, when at least some known AFC systems are deactivated such that no AFC air flow is discharged from the AFC system, debris and/or insects can enter the AFC system and foul an air distribution system of the AFC system. Moreover, wind gusts suddenly increase an effective angle of attack of the blade, which can yield high, unsteady loads on the blade. Such high and/or unsteady loads can adversely affect a structure of the blade.

BRIEF DESCRIPTION OF THE INVENTION

In one aspect, an active flow control system for use with a wind turbine is provided. The wind turbine includes at least one blade. The active flow control system includes an air distribution system at least partially defined within said at least one blade. The air distribution system includes at least one aperture defined through the at least one blade. An aperture control system is in operational control communication with the air distribution system. The aperture control system includes an actuator at least partially positioned within the at least one blade and configured to control a flow of air discharged through the at least one aperture.

In another aspect, a method of manufacturing a blade for a wind turbine is provided. The wind turbine includes an active flow control system having an aperture and an actuator. The method includes defining the aperture through the blade, coupling an actuator at least partially within the blade. The actuator is configured to control a flow of air discharged through the aperture.

In yet another aspect, a method for operating an active flow control system is provided. The active flow control system is at least partially defined within a blade of a wind turbine and includes an aperture defined through the blade and an actuator associated with the aperture. The method includes measuring at least one of an environmental condition and an operational condition of the wind turbine using a sensor, and controlling a size of the aperture based on the measured condition using the actuator associated with the aperture.

BRIEF DESCRIPTION OF THE DRAWINGS

FIGS. 1-14 show exemplary embodiments of the systems and methods described herein.

FIG. 1 is a perspective view of an exemplary wind turbine.

FIG. 2 is a schematic view of an exemplary flow control system that may be used with the wind turbine shown in FIG. 1.

FIG. 3 is a schematic view of the flow control system shown in FIG. 2.

FIG. 4 is a schematic view of a first alternative flow control system that may be used with the wind turbine shown in FIG. 1

FIG. 5 is a schematic view of a second alternative flow control system that may be used with the wind turbine shown in FIG. 1.

FIG. 6 is a schematic view of a third alternative flow control system that may be used with the wind turbine shown in FIG. 1.

FIG. 7 is a schematic view of a fourth alternative flow control system that may be used with the wind turbine shown in FIG. 1.

FIG. 8 is a schematic view of an aperture control system that may be used with the flow control systems shown in FIGS. 2-7.

FIG. 9 is a schematic view of an exemplary actuator that may be used with the aperture control system shown in FIG. 8.

FIG. 10 is a schematic view of an exemplary lid that may be used with the actuator shown in FIG. 9.

FIG. 11 is a schematic view of an alternative actuator that may be used with the aperture control system shown in FIG. 8.

FIG. 12 is a schematic view of a first alternative aperture control system that may be used with the active flow control systems shown in FIGS. 2-7.

FIG. 13 is a schematic view of a second alternative aperture control system that may be used with the active flow control systems shown in FIGS. 2-7.

FIG. 14 is a schematic view of a third alternative aperture control system that may be used with the active flow control systems shown in FIGS. 2-7.

DETAILED DESCRIPTION OF THE INVENTION

The embodiments described herein provide an aperture control system that controls a size of an aperture to control a flow rate of an active flow control (AFC) air flow discharged therethrough. More specifically, an actuator selectively opens, partially opens, partially closes, and/or closes an associated aperture to control the flow rate. Further, the aperture control system controls a direction of the discharged AFC air flow using the actuator, a capillary, and/or a chamber. By controlling the flow rate and the direction of the discharged AFC air flow, the aperture control system can control an AFC response of an AFC system to vary or adjust a load on at least one blade of a wind turbine. As such, the aperture control system described herein can reduce a load on one blade, balance loads among blades, and/or otherwise improve an effectiveness of the AFC system. As the AFC response of a blade is varied, an environmental condition and/or an operational condition of the wind turbine is measured by at least one sensor, and the AFC response is further varied by the aperture control system based on the measurement. As such, the embodiments described herein provide for closed-loop control of the AFC response using at least one sensor.

As used herein, the term "environmental condition" refers to a property of the environment, such as the ambient air, surrounding a wind turbine. Non-limiting examples of environmental conditions include a wind speed, a flowrate, a temperature, a humidity, a pressure, and/or a wind direction. Further, as used herein the term "operational condition" refers to a property of the wind turbine. Non-limiting examples of operational conditions include an angle of attack, a rotations-per-minute, and/or a yaw direction. It should be understood that there may be overlap between environmental conditions and operational conditions because the environment surrounding the wind turbine affects the operation of a wind turbine.

Figure 1:
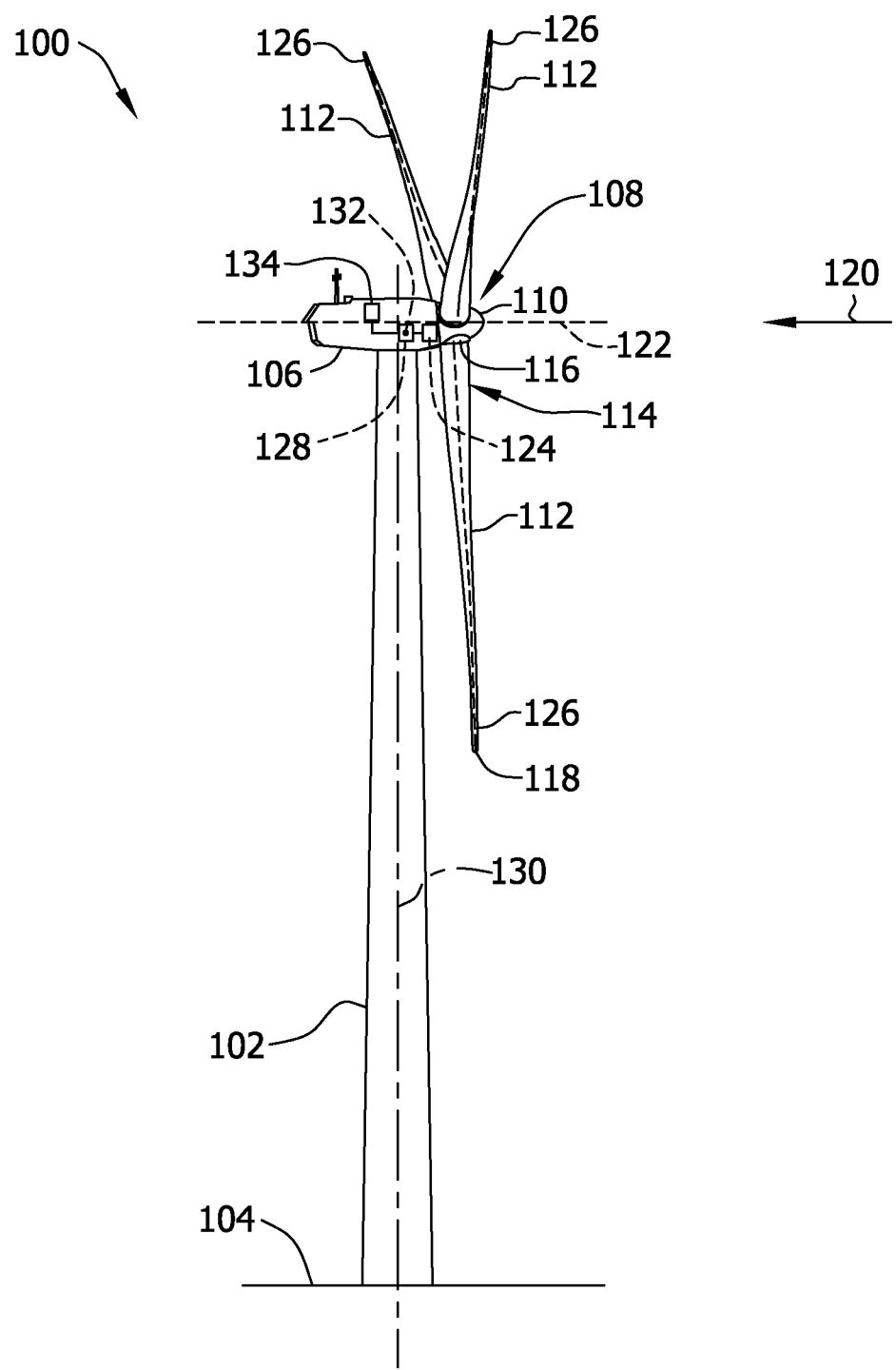

FIG. 1 is a perspective view of an exemplary wind turbine 100. In the exemplary embodiment, wind turbine 100 is a nearly horizontal-axis wind turbine. In another embodiment, wind turbine 100 may have any suitable tilt angle. Alternatively, wind turbine 100 may be a vertical axis wind turbine. In the exemplary embodiment, wind turbine 100 includes a tower 102 that extends from a supporting surface 104, a nacelle 106 mounted on tower 102, and a rotor 108 that is coupled to nacelle 106. Rotor 108 includes a rotatable hub 110 and at least one blade 112 coupled to and extending outward from hub 110. In the exemplary embodiment, rotor 108 has three blades 112. In an alternative embodiment, rotor 108 includes more or less than three blades 112. In the exemplary embodiment, tower 102 is fabricated from tubular steel such that a cavity (not shown in FIG. 1) is defined between supporting surface 104 and nacelle 106. In an alternative embodiment, tower 102 is any suitable type of tower. A height of tower 102 is selected based upon factors and conditions known in the art.

Blades 112 are spaced about hub 110 to facilitate rotating rotor 108 to enable kinetic energy to be transferred from the wind into usable mechanical energy, and subsequently, electrical energy. Blades 112 are mated to hub 110 by coupling a blade root portion 114 to hub 110 at a plurality of load transfer regions 116. Load transfer regions 116 have a hub load transfer region and a blade load transfer region (both not shown in FIG. 1). Loads induced to blades 112 are transferred to hub 110 via load transfer regions 116. As used herein, the terms "longitudinal", "longitudinal direction", "spanwise", and "spanwise direction" with respect to blade 112 refer to an axis extending between root portion 114 of blade 112 and a tip 118 of blade 112 and to a direction along that axis. The terms "chordwise" and "chordwise direction" with respect to blade 112 refer to an axis extending between a leading edge of blade 112 and a trailing edge of blade 112 and to a direction along that axis. The chordwise direction is perpendicular to the longitudinal direction.

In the exemplary embodiment, blades 112 have a length of between approximately 30 meters (m) (99 feet (ft)) and approximately 120 m (394 ft). Alternatively, blades 112 may have any length that enables wind turbine 100 to function as described herein. As wind strikes blades 112 from a direction 120, rotor 108 is rotated about an axis of rotation 122. As blades 112 are rotated and subjected to centrifugal forces, blades 112 are also subjected to various forces and moments. As such, blades 112 may deflect and/or rotate from a neutral, or non-deflected, position to a deflected position. Moreover, a pitch angle of blades 112, i.e., an angle that determines a perspective of blades 112 with respect to a rotor plane, may be changed by a pitch adjustment system 124 to control power, load, and/or noise generated by wind turbine 100 by adjusting an angular position of a profile of at least one blade 112 relative to wind vectors. Pitch axes 126 for blades 112 are illustrated as being parallel to a longitudinal or spanwise axis. In the exemplary embodiment, a pitch of each blade 112 is controlled individually by a control system 128. Alternatively, the blade pitch for all blades 112 may be controlled simultaneously by control system 128. Further, in the exemplary embodiment, as direction 120 changes, a yaw direction of nacelle 106 may be controlled about a yaw axis 130 to position blades 112 with respect to direction 120.

In the exemplary embodiment, control system 128 is shown as being centralized within nacelle 106, however control system 128 may be a distributed system throughout wind turbine 100, on supporting surface 104, within a wind farm, and/or at a remote control center. Control system 128 includes a processor 132 configured to perform the methods and/or steps described herein. Further, many of the other components described herein include a processor. As used herein, the term "processor" is not limited to integrated circuits referred to in the art as a computer, but broadly refers to a controller, a microcontroller, a microcomputer, a programmable logic controller (PLC), an application specific integrated circuit, and other programmable circuits, and these terms are used interchangeably herein. It should be understood that a processor and/or control system can also include memory, input channels, and/or output channels.

In the embodiments described herein, memory may include, without limitation, a computer-readable medium, such as a random access memory (RAM), and a computer-readable non-volatile medium, such as flash memory. Alternatively, a floppy disk, a compact disc-read only memory (CD-ROM), a magneto-optical disk (MOD), and/or a digital versatile disc (DVD) may also be used. Also, in the embodiments described herein, input channels may include, without limitation, sensors and/or computer peripherals associated with an operator interface, such as a mouse and a keyboard. Further, in the exemplary embodiment, output channels may include, without limitation, a control device, an operator interface monitor, and/or a display.

Processors described herein process information transmitted from a plurality of electrical and electronic devices that may include, without limitation, sensors, actuators, compressors, control systems, and/or monitoring devices. Such processors may be physically located in, for example, a control system, a sensor, a monitoring device, a desktop computer, a laptop computer, a PLC cabinet, and/or a distributed control system (DCS) cabinet. RAM and storage devices store and transfer information and instructions to be executed by the processor(s). RAM and storage devices can also be used to store and provide temporary variables, static (i.e., non-changing) information and instructions, or other intermediate information to the processors during execution of instructions by the processor(s). Instructions that are executed may include, without limitation, flow control system control commands.

The execution of sequences of instructions is not limited to any specific combination of hardware circuitry and software instructions.

In the exemplary embodiment, wind turbine 100 includes at least one sensor 134. Sensor 134 includes at least one of an angle of attack sensor, a wind speed sensor, a rotations-per-minute sensor, a yaw sensor, a flowrate sensor, a temperature sensor, a humidity sensor, a pressure sensor, a wind direction sensor, and/or any other suitable sensor configured to detect, sense, and/or measure ambient, environmental, and/or operational conditions. Sensor 134 is coupled in communication with control system 128 for transmitting data to control system 128.

Figure 6:
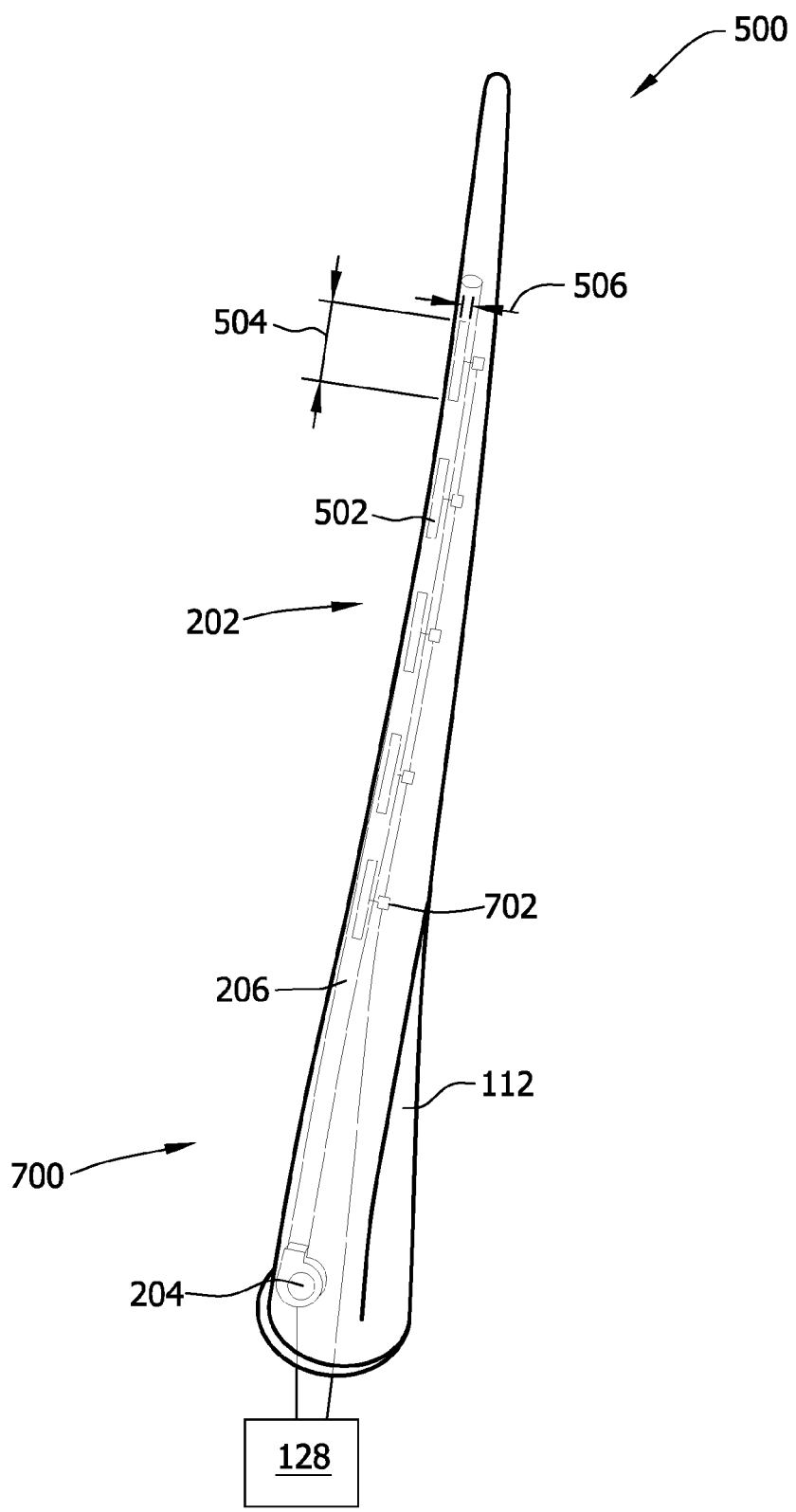
Figure 7:
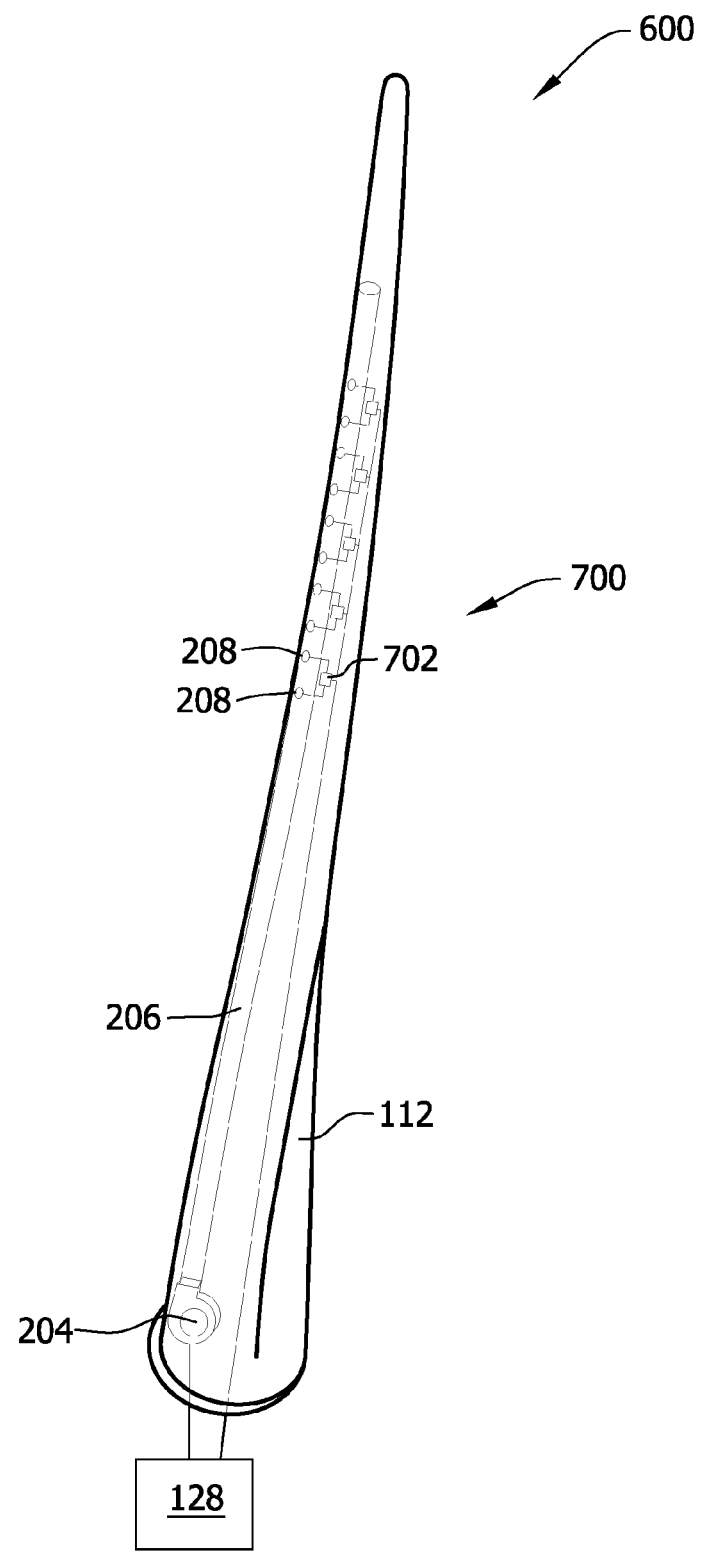
Figure 8:
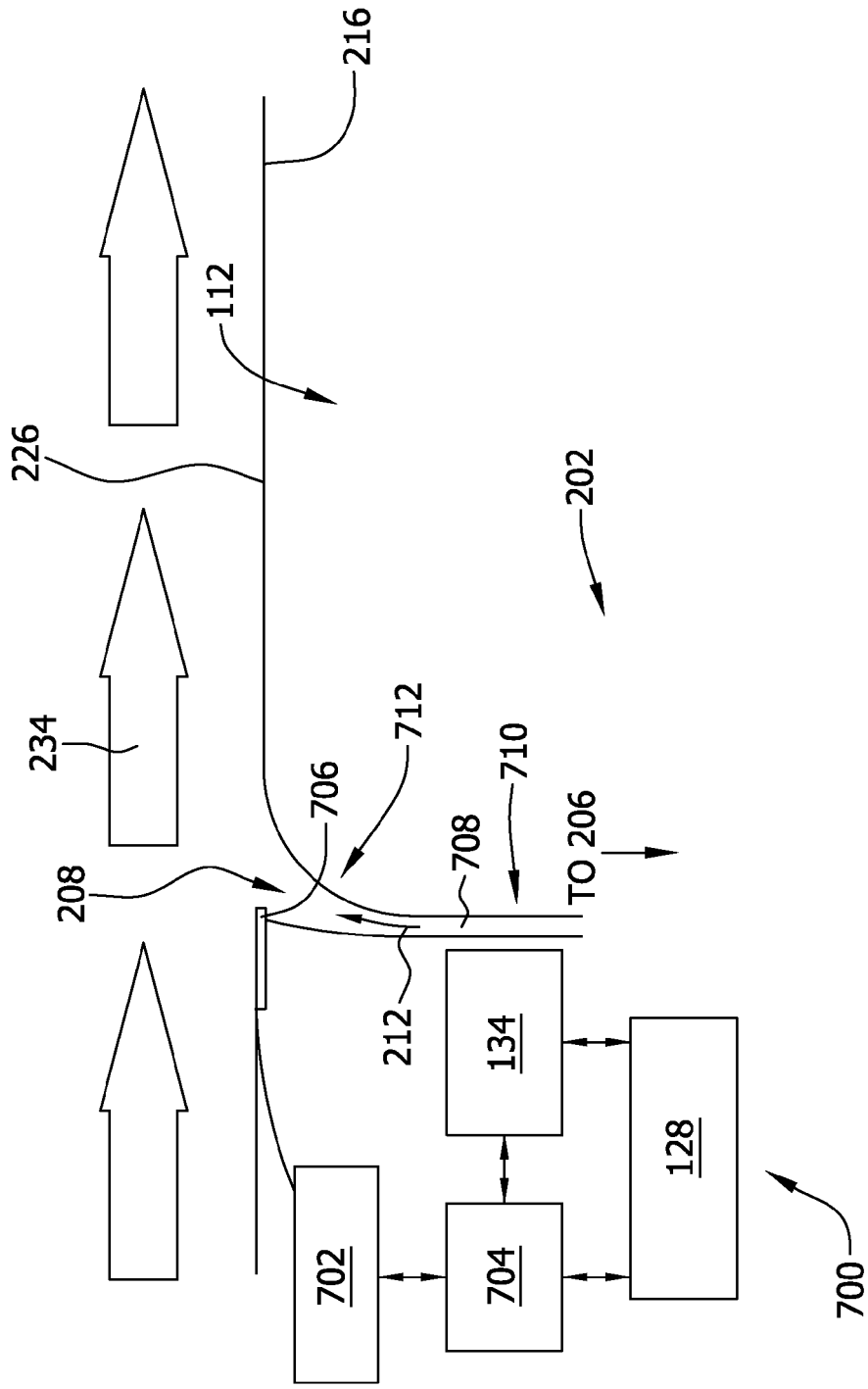

Exemplary flow control systems for use with wind turbine 100 will be described with respect to FIGS. 2-7, followed by a description of an aperture control system, as shown in FIG. 8. Descriptions of exemplary aperture and/or actuator configurations for use with an aperture control system will then be described with respect to FIGS. 9-14.

Figure 2:
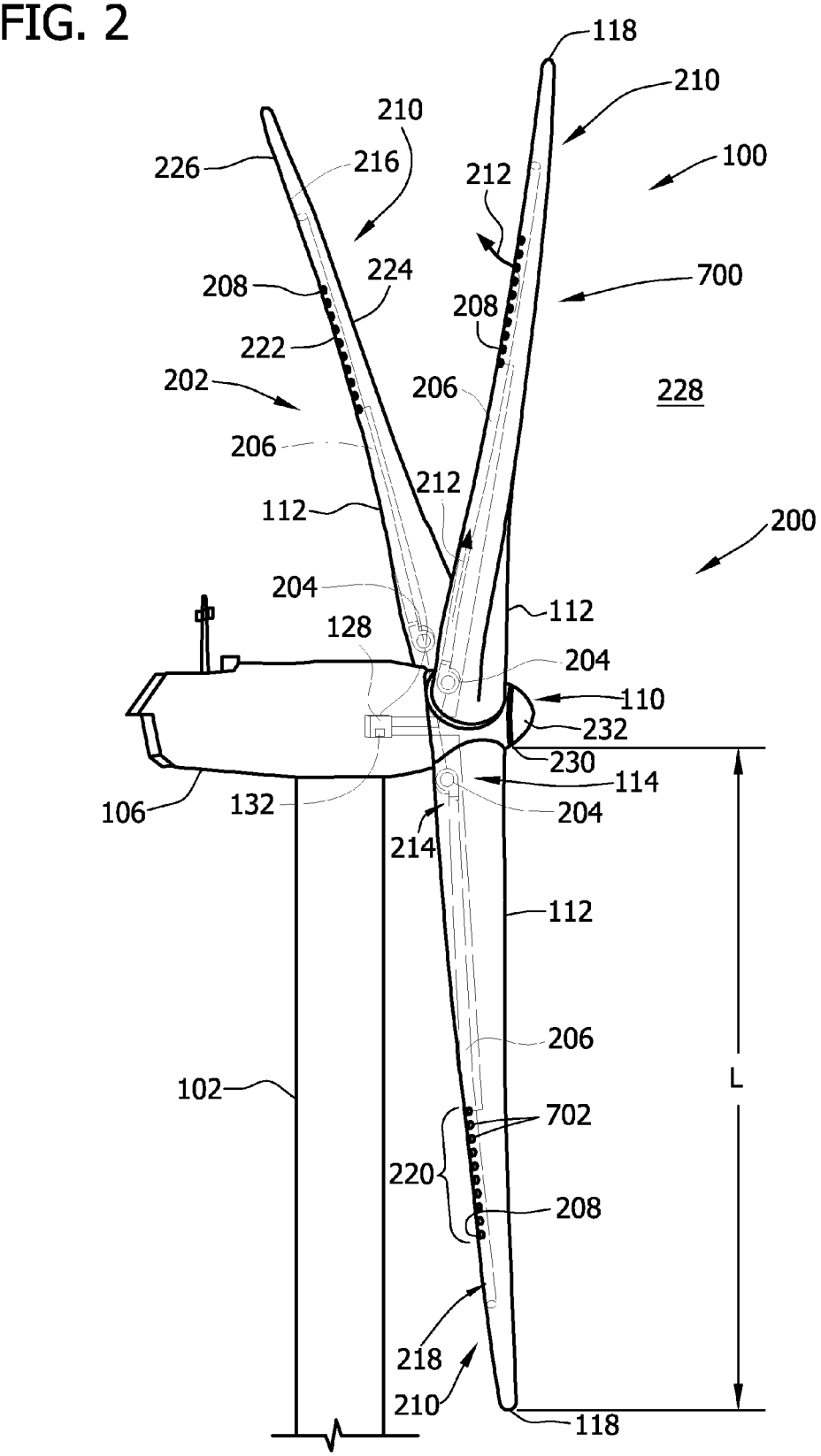
Figure 3:
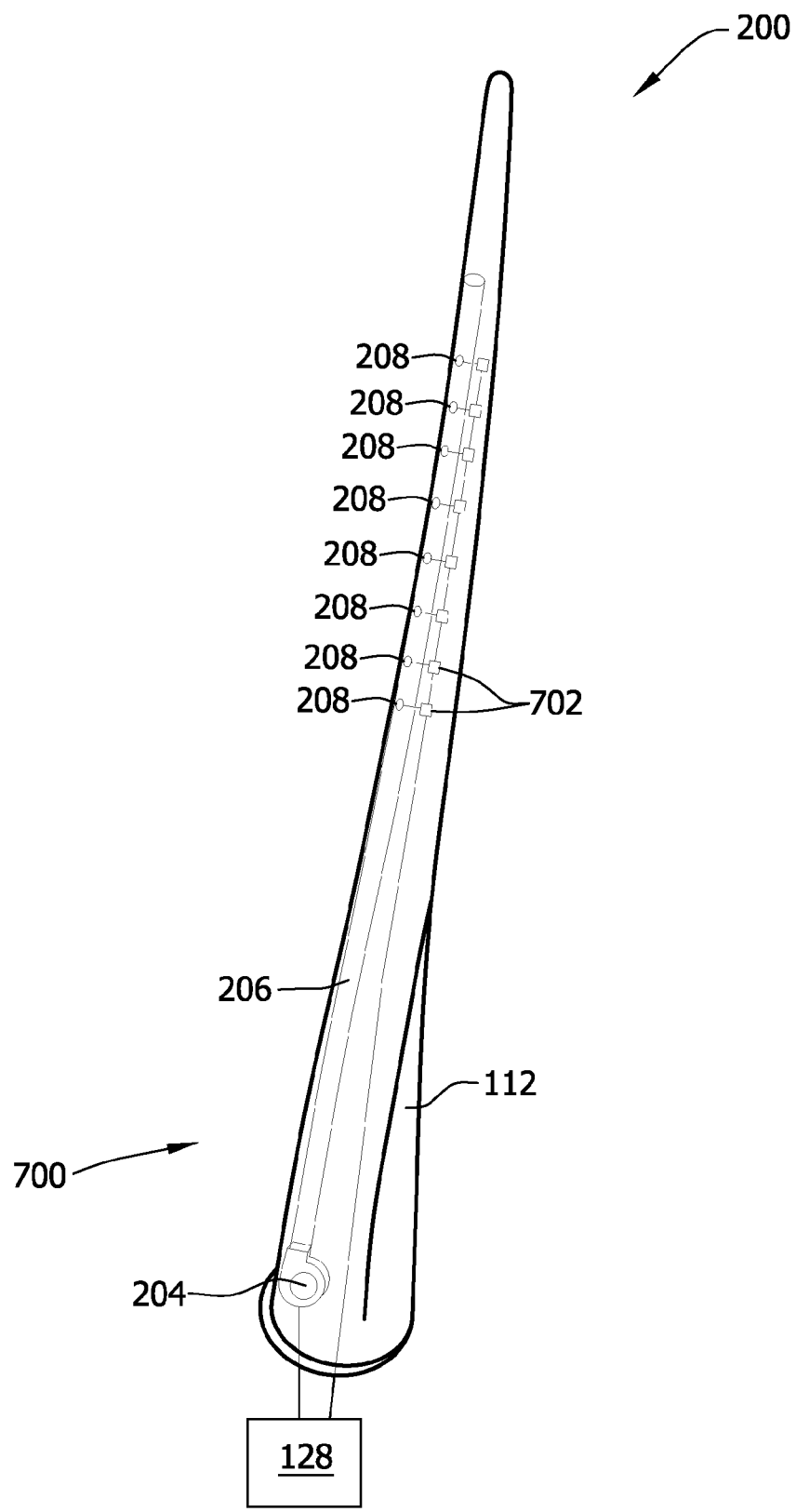

FIG. 2 is a schematic view of an exemplary flow control system 200 that may be used with wind turbine 100. FIG. 3 is a more detailed schematic view of flow control system 200. Arrangements of apertures and/or actuators can differ from those illustrated in FIGS. 2 and 3. Some such alternate aperture and/or actuator arrangements are shown in FIGS. 4-7.

Figure 4:
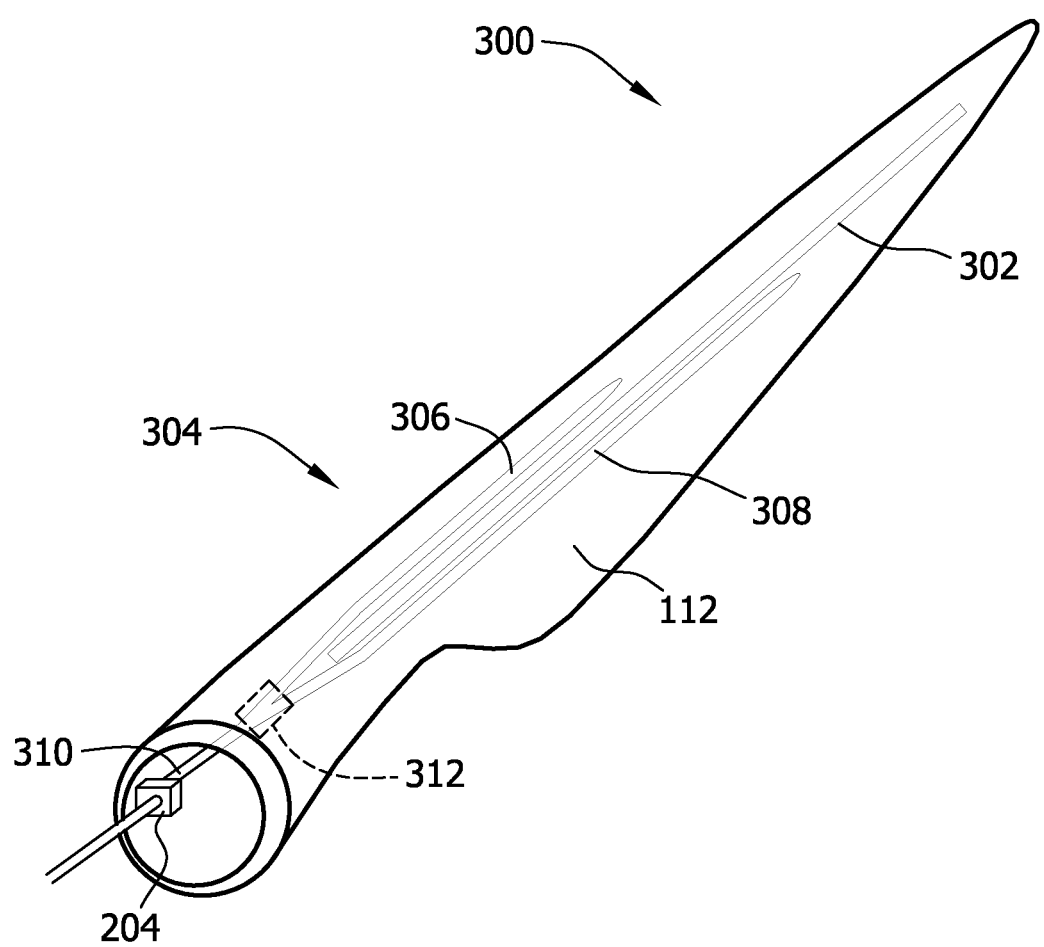
Figure 5:
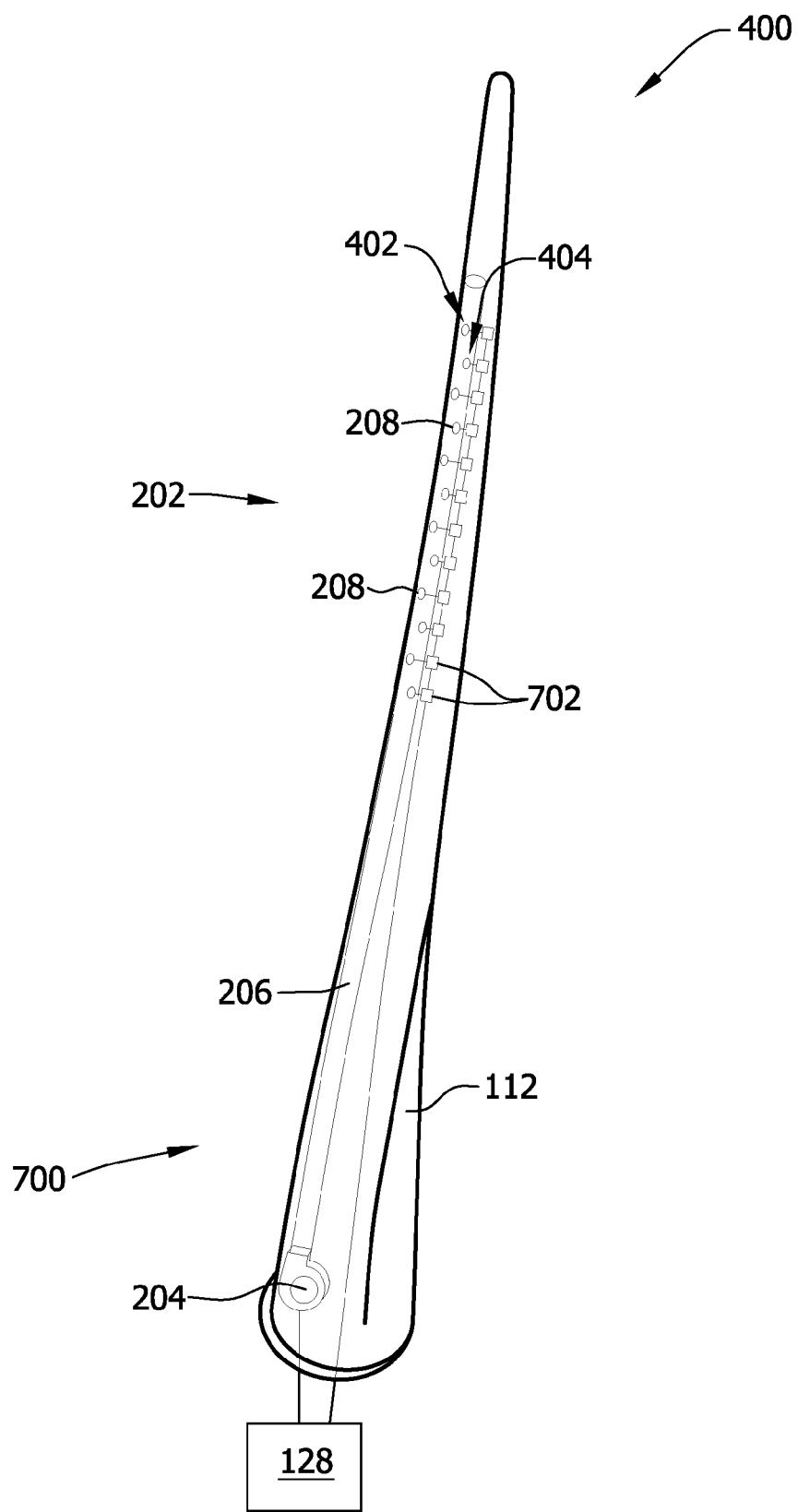

More specifically, FIG. 4 is a schematic view of a first alternative flow control system 300 that may be used with wind turbine 100. FIG. 5 is a schematic view of a second alternative flow control system 400 that may be used with wind turbine 100. FIG. 6 is a schematic view of a third alternative flow control system 500 that may be used with wind turbine 100. FIG. 7 is a schematic view of a fourth alternative flow control system 600 that may be used with wind turbine 100. Flow control systems 300, 400, 500, and 600 are substantially similar to flow control system 200 (shown in FIGS. 2 and 3), except for the differences noted herein. As such, components shown in FIGS. 4-7 are labeled with the same reference numbers used in FIGS. 2 and 3.

Referring to FIGS. 2 and 3, in the exemplary embodiment, flow control system 200 is a nonzero-net-mass flow control system that includes an air distribution system 202. Control system 128 is considered to be a component of flow control system 200 and is in operational control communication with air distribution system 202. As used herein, "operational control communication" refers to a link, such as a conductor, a wire, and/or a data link, between two or more components of wind turbine 100 that enables signals, electric currents, and/or commands to be communicated between the two or more components. The link is configured to enable one component to control an operation of another component of wind turbine 100 using the communicated signals, electric currents, and/or commands.

Air distribution system 202 includes at least one flow control device 204, at least one manifold 206, and at least one aperture 208. At least one flow control device 204, a respective manifold 206, and one or more corresponding apertures 208 form an assembly 210. Each blade 112 includes an assembly 210 at least partially defined therein. As such, air distribution system 202 includes a plurality of flow control devices 204, a plurality of manifolds 206, and a plurality of apertures 208. Alternatively, at least one blade 112 includes an assembly 210. In the exemplary embodiment, each assembly 210 is substantially similar, however, at least one assembly 210 may be different than at least one other assembly 210. Further, although in the exemplary embodiment each assembly 210 includes a flow control device 204, at least two assemblies 210 may share a common flow control device 204.

Flow control device 204 is, for example, a pump, a compressor, a fan, a blower, and/or any other suitable device for controlling a flow of a fluid. In one embodiment, flow control device 204 and/or assembly 210 includes a valve (not shown) that is configured to regulate a flow within air distribution system 202, such as a flow rate and/or a flow direction. In the exemplary embodiment, flow control device 204 is reversible for changing a direction of a fluid flow 212. When fluid flow 212 is discharged from aperture 208, fluid flow 212 is considered to be an AFC air flow 212. Control system 128 is in operational control communication with each flow control device 204 for controlling fluid flows through air distribution system 202. Control system 128 may be directly coupled in operational control communication with each flow control device 204 and/or may be coupled in operational control communication with each flow control device 204 via a communication hub and/or any other suitable communication device(s).

Further, in the exemplary embodiment, air distribution system 202 includes one flow control device 204 for each blade 112 of wind turbine 100. Each flow control device 204 is in flow communication with at least one manifold 206. In the exemplary embodiment, a flow control device 204 is coupled within a respective blade 112 at a root end 214 of each manifold 206 and/or root portion 114 of each blade 112. Alternatively, flow control device 204 may be in any suitable position within wind turbine 100, such as hub 110 and/or nacelle 106, and/or on supporting surface 104 (shown in FIG. 1). It should be understood that air distribution system 202 can include any suitable number of flow control devices 204. For example, air distribution system 202 can include one centralized flow control device 204 within hub 110 and/or nacelle 106 that is in flow communication with each manifold 206. In such an embodiment, flow control device 204 can include at least one valve (not shown) configured to distribute flow among manifolds 206.

In the exemplary embodiment, each manifold 206 is at least partially defined along an inner surface 216 within respective blade 112 and extends generally along a respective pitch axis 126 (shown in FIG. 1) from root end 214 of manifold 206 to a tip end 218 of manifold 206. It should be understood that tip end 218 is not necessarily positioned within tip 118 of blade 112, but rather, is positioned nearer tip 118 than manifold root end 214. In one embodiment, apertures 208 are defined at a predetermined portion 220 of a length L of blade 112 from root end 214 within tip end 218. Further, it should be understood that manifold 206 may have any suitable configuration, cross-sectional shape, length, and/or dimensions that enables air distribution system 202 and/or flow control system 200 to function as described herein. It should also be understood that one or more components of blade 112 can be used to form manifold 206.

Referring to FIG. 4, when blade 112 includes an internal support structure 302, an air distribution system 304 includes a first manifold 306 and a second manifold 308 positioned on each side of support structure 302. Manifolds 306 and 308 can be referred to as "branch manifolds". Although only two branch manifolds 306 and 308 are described herein, it should be understood that air distribution system 304 can include any suitable number of manifolds, whether or not blade 112 includes support structure 302. In the exemplary embodiment, flow control device 204 is in flow communication with both manifolds 306 and 308 via a trunk manifold 310. Optionally, air distribution system 304 includes a valve 312 coupled between trunk manifold 310 and branch manifolds 306 and 308. Valve 312 is configured to distribute flow and/or switch flow between branch manifolds 306 and 308 such that any suitable ratio of flow is distributed to branch manifolds 306 and/or 308.

Referring again to FIGS. 2 and 3, air distribution system 202 also includes at least one aperture 208 in flow communication with respective manifold 206. More specifically, in the exemplary embodiment, air distribution system 202 includes a plurality of apertures 208 defined along a suction side 222 of respective blade 112. Alternatively or additionally, apertures 208 are defined through a pressure side 224 of blade 112. In the exemplary embodiment, aperture 208 is defined through an outer surface 226 of blade 112 for providing flow communication between manifold 206 and ambient air 228. Apertures 208 can have any suitable configuration and/or shape that enables air distribution system 202 to function as described herein. Although apertures 208 are shown as being aligned in a line along suction side 222, it should be understood that apertures 208 may be positioned anywhere along suction side 222 of blade 112 that enables flow control system 200 to function as described herein.

For example, air distribution system 202 can include multiple rows 402 and 404 of apertures 208 as shown in FIG. 5 and/or elongated slits 502 as shown in FIG. 6. Although only two rows 402 and 404 of apertures 208 are described herein, it should be understood that air distribution system 202 can include any suitable number of rows 402 and 404 of apertures 208 at any suitable location with respect to blade 112. When air distribution system 202 includes multiple rows 402 and 404 of apertures 208 as shown in FIG. 5, rows 402 and 404 can be in flow communication with a common manifold 206 such that rows 402 and 404 share manifold 206 or rows 402 and 404 can be in flow communication with a respective manifold 206 such that each row 402 and 404 is associated with its own manifold 206. Similarly, when air distribution system 202 includes elongated slits 502 as shown in FIG. 6, slits 502 can be in flow communication with a common manifold 206 or each slit 502 can be in flow communication with a respective manifold 206. Elongated slits 502 each have a longitudinal length 504 that is greater than a chordwise width 506.

Referring to FIGS. 2 and 3, flow control devices 204 are, in the exemplary embodiment, in flow communication with ambient air 228 via an opening 230 defined between hub 110 and a hub cover 232. Alternatively, wind turbine 100 does not include hub cover 232, and ambient air 228 is drawn into air distribution system 202 through an opening 230 near hub 110. In the exemplary embodiment, flow control devices 204 are configured to draw in ambient air 228 through opening 230 and to discharge fluid flow 212 generated from ambient air 228 into respective manifold 206. Alternatively, opening 230 may be defined at any suitable location within hub 110, nacelle 106, blade 112, tower 102, and/or auxiliary device (not shown) that enables air distribution system 202 to function as described herein. Further, air distribution system 202 may include more than one opening 230 for drawing air into air distribution system 202, such as including one opening 230 for each flow control device 204. In an alternative embodiment, a filter is included within opening 230 for filtering air 228 entering air distribution system 202. It should be understood that the filter referred to herein can filter particles from a fluid flow and/or separate liquid from the fluid flow.

Referring to FIGS. 1-3, in the exemplary embodiment, flow control system 200 includes an aperture control system 700. Aperture control system 700 includes control system 128, at least one sensor 134, and at least one actuator 702 configured to control air flow 212 from manifold 206 through at least one aperture 208. More specifically, in the exemplary embodiment, an actuator 702 is associated with each aperture 208 to control flow through a respective aperture 208. Alternatively, as shown in FIG. 7, flow control system 600 includes one actuator 702 that is associated with a plurality of apertures 208. Although each actuator 702 shown in FIG. 7 is associated with two apertures 208, it should be understood that each actuator 702 can be associated with any suitable number of apertures 208. Further, it should also be understood that the embodiment shown in FIG. 7 can be combined with the embodiments shown in FIGS. 4-6. For example, one actuator 702 can be associated with apertures 208 in one row 402 or 404 (shown in FIG. 5) or in a plurality of rows 402 and 404. Further, one actuator 702 can be associated with a plurality of slits 502 (shown in FIG. 6).

Actuator 702, as described herein, can be an electrical and/or mechanical actuator. For example, actuator 702 can be a shape memory alloy (SMA) actuator, a piezoelectric mechanism actuator, a shape memory polymer (SMP) actuator, an optical actuator, a micro optical-actuated electro-mechanical system (MOEM) actuator, a micro-electromechanical system (MEMS) actuator, a flow control valve, a solenoid valve, a butterfly valve nozzle, a variable area valve, and/or any other suitable actuator and/or valve that enables flow control system 200, 300, 400, 500, and/or 600 to function as described herein. It should be understood that one or more types of actuators can be used with the same flow control system 200, 300, 400, 500, and/or 600.

In a particular embodiment, actuator 702 includes a flow control surface (not shown) over which fluid is designed to flow in a predetermined direction. The flow control surface has a pivot axis that forms an angle with respect to the predetermined direction and is positionable to create a swirling fluid flow.

When actuator 702 includes an SMA actuator, actuator 702 is configured to bend, twist, and/or morph to move a flap. For example, the SMA actuator changes to move the flap to be at an acute angle of between about 5° and about 45° with respect to the predetermined direction when the flap is in an extended position. Further, actuator 702 can include a heater that actuates a shape memory material made from nickel-titanium (NiTi) alloy, silver-cadmium (AgCd) alloy, gold-cadmium (AuCd) alloy, copper-aluminum-nickel (CuAlNi) alloy, copper-tin (CuSn) alloy, copper-zinc (CuZn) alloy, copper-zinc-silicon (CuZnSi) alloy, copper-zinc-tin (CuZzSn) alloy, copper-zinc-aluminum (CuZnAl) alloy, indium-titanium (InTi) alloy, nickel-aluminum (NiAl) alloy, iron-platinum (FePt) alloy, manganese-copper (MnCu) alloy, iron-manganese-silicon (FeMnSi) alloy, iron-chromium-nickel-cobalt-manganese-silicon (Fe—Cr—Ni—Co—Mn—Si) alloy, and/or iron-chromium-nickel-manganese-silicon (Fe—Cr—Ni—Mn—Si) alloy. However other types of electro-mechanical actuators may also be used as actuator 702.

A motor (not shown) of actuator 702 is repositionable and actuates the flow-deflecting flap. Actuator 702 further includes a heater (not shown) controlled by electrical input from, for example, an external controller. The flap formed with a SMA is initially deformed to be in the extended position during manufacture. Upon application of heat above a particular transition temperature of the SMA by the heater, the flap returns to the non-deformed state. As such, the flap is initially in a retracted or non-deployed position and, when heat is applied to the SMA, the flap moves from its original position to the extended or deployed position. The SMA actuator is switched between a first state and a second state by heating the SMA using at least one thermoelectric device (not shown) connected to an internal heat sink (not shown). As such, the heat is conducted from the internal heat sink to the SMA to cause the SMA to switch from the first state to the second state.

When actuator 702 includes a SMP actuator, actor 702 includes a polymeric smart material that has the ability to return from a temporary, deformed state to their permanent, original shape as induced by an external stimulus, such as a temperature change. In addition to temperature change, the shape memory effect of SMPs can also be triggered by an electric field, a magnetic field, light, and/or a change in pH. The SMPs also cover a wide property range—from stable to biodegradable, soft to hard, and/or elastic to rigid—depending on structural units constituting the SMP. The SMPs include thermoplastic and thermoset (covalently cross-linked) polymeric materials and are able to store up to three different shapes in memory.

FIG. 8 is a schematic view of an aperture control system 700 that may be used with flow control systems 200, 300, 400, 500, and/or 600 (shown in FIGS. 2-7). For clarity, aperture control system 700 is described with respect to flow control system 200. In the exemplary embodiment, actuator 702 includes a controller 704 and a stop 706 that is selectably moveable with respect to aperture 208 between a closed position and an open position. Each actuator controller 704 is coupled in control communication with control system 128. More specifically, control system 128 is configured to control each actuator 702, via controller 704, to control a flow of air through each aperture 208. As described in more detail below, control system 128 uses at least an output from sensor 134 to control at least one actuator 702 to move stop 706 to a predetermined position with respect to at least one aperture 208.

In the exemplary embodiment, a capillary 708 is in flow communication between at least one aperture 208 and manifold 206. Capillary 708 can be relatively short compared to a length of manifold 206. A shape and/or size of capillary 708 is based on a type of actuator 702, a chordwise location of aperture 208 with respect to blade 112, a longitudinal location of aperture 208 with respect to blade 112, and/or a typical air flow speed over outer surface 226 of blade 112. In the exemplary embodiment, capillary 708 includes a substantially linear portion 710 and a curved portion 712. Linear portion 710 is adjacent manifold 206, and curved portion 712 is adjacent aperture 208. Curved portion 712 is configured to discharge an AFC air flow 212 towards a downstream direction of an outer air flow 234, rather than discharging AFC air flow 212 in a direction substantially perpendicular to outer air flow 234, which may cause boundary-layer blow-off. In an alternative embodiment, capillary 708 is omitted, and aperture 208 is defined in manifold 206.

Figure 9:
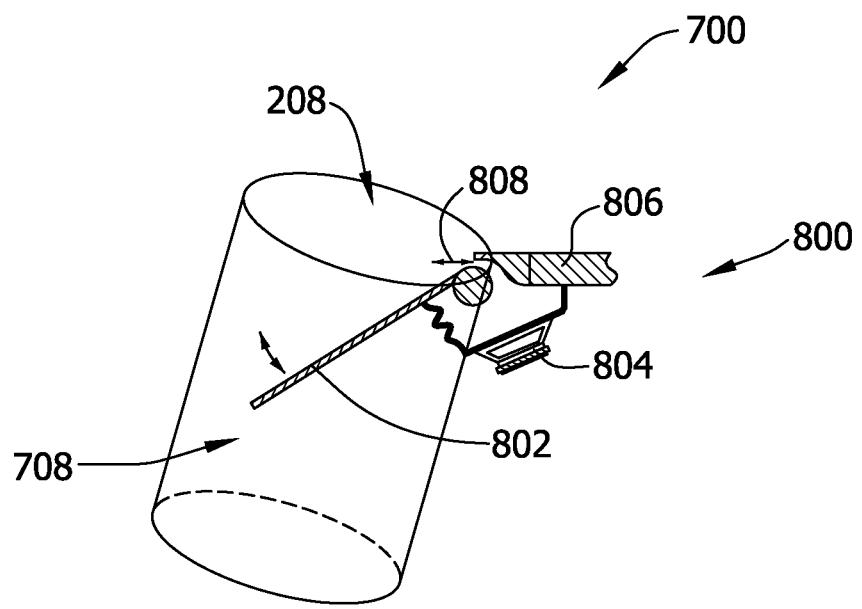
Figure 10:
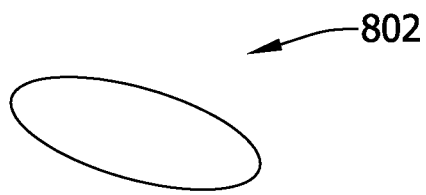

FIG. 9 is a schematic view of an exemplary actuator 800 that may be used with aperture control system 700 (shown in FIG. 8). FIG. 10 is a schematic view of an exemplary lid 802 that may be used with actuator 800. In the exemplary embodiment, actuator 800 is a piezoelectric actuator that includes a controller 804, a stop 806, and lid 802. Controller 804 is configured to be coupled in operational control communication with control system 128 (shown in FIG. 1). Stop 806 is positioned adjacent aperture 208 and is configured to move in a direction 808 substantially parallel to surface 216 and/or 226 of blade 112 (all shown in FIG. 8). More specifically, actuator 800 is configured to extend stop 806 across aperture 208 to a closed position and retract stop 806 from aperture 208 to an open position. Actuator 800 is configured to position stop 806 at the closed position, at the open position, and/or at any position between the open and closed positions.

Lid 802 is rotatable with respect to surface 216 and/or 226 of blade 112. More specifically, lid 802 is configured to rotate with respect to outer surface 226 of blade 112 between a closed position substantially parallel to outer surface 226 and an open position within capillary 708. Alternatively, lid 802 moves outwardly from capillary 708 into outer air flow 234 (shown in FIG. 8) to an open position. In the exemplary embodiment, lid 802 is shaped to correspond to a shape of aperture 208 to move to the closed position to seal aperture 208 when AFC air flow 212 (shown in FIG. 8) is not being discharged from aperture 208. As such, lid 802 prevents fouling of air distribution system 202 (shown in FIGS. 2 and 3) when flow control system 200 is not activated. When aperture 208 is elliptical shaped as shown in FIG. 9, lid 802 is also elliptical shaped as shown in FIG. 10. Further, in the exemplary embodiment, lid 802 is formed from any suitable material. In one embodiment, lid 802 is formed from a rubber material. In the exemplary embodiment, controller 804 is configured to move stop 806 and lid 802 in concert with each other or individually, depending on environmental conditions, operational conditions, location of aperture 208 with respect to blade 112, and/or any other suitable conditions. Alternatively, actuator 800 does not include lid 802.

Figure 11:
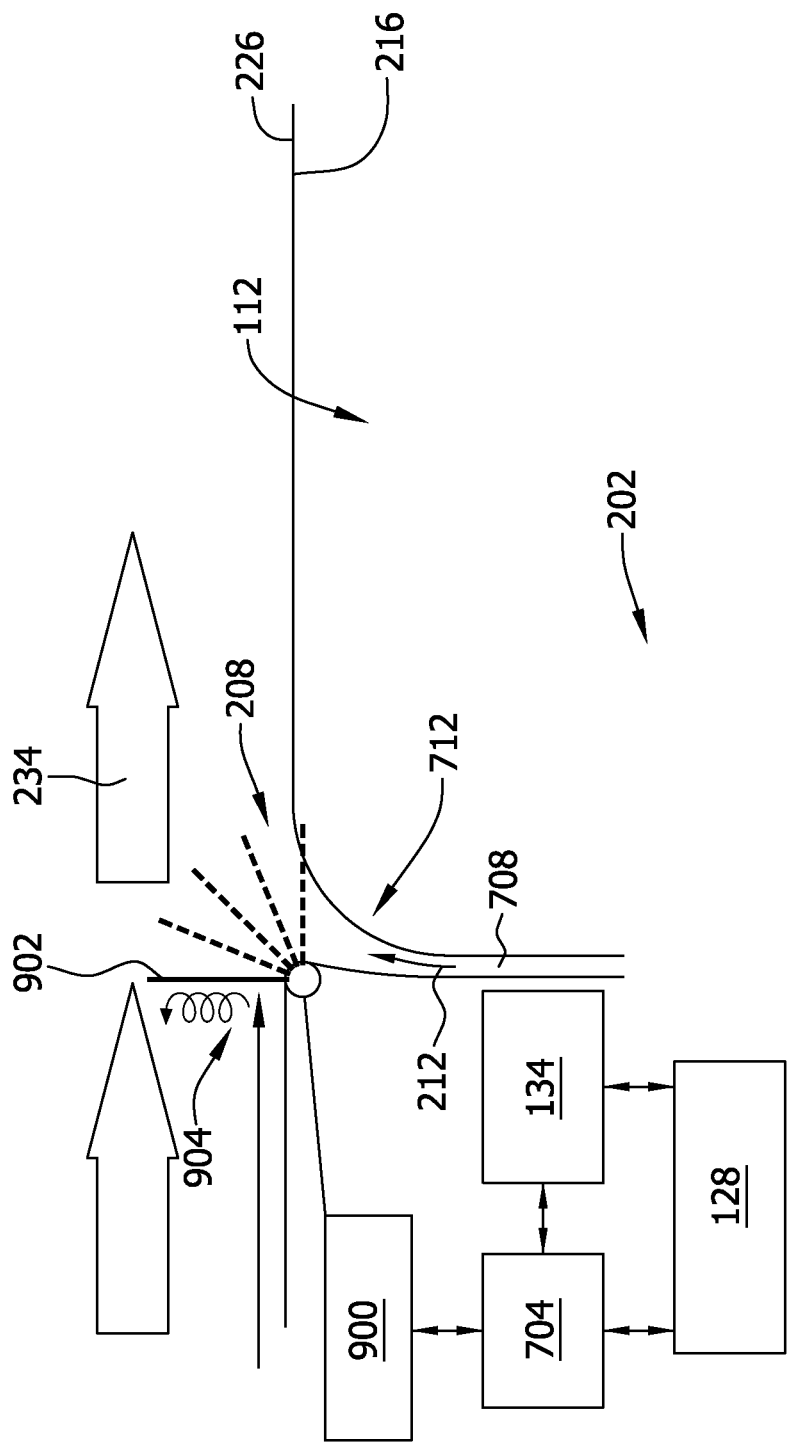

FIG. 11 is a schematic view of an alternative actuator 900 that may be used with aperture control system 700 (shown in FIG. 8). Actuator 900 can be used as an alternative to actuator 800 (shown in FIG. 9) or can be part of actuator 800. In the exemplary embodiment, actuator 900 includes a flap 902 that is configured to rotate into outer air flow 234 to generate a vortex 904. As such, flap 902 has a vortex-generating shape that is configured to alter flow separation near aperture 208. Accordingly, flap 902 is also referred to herein as a vortex generator. When actuator 900 is used instead of actuator 800, flap 902 is also configured to open and/or close aperture 208 to control AFC air flow 212 being discharged from aperture 208. When actuator 900 is used as part of actuator 800, lid 802 (shown in FIGS. 9 and 10) can be used as flap 902, flap 902 can be used as lid 802, or actuator 800, 900 can include lid 802 and flap 902, which both work in conjunction with stop 806 (shown in FIG. 9).

Figure 12:
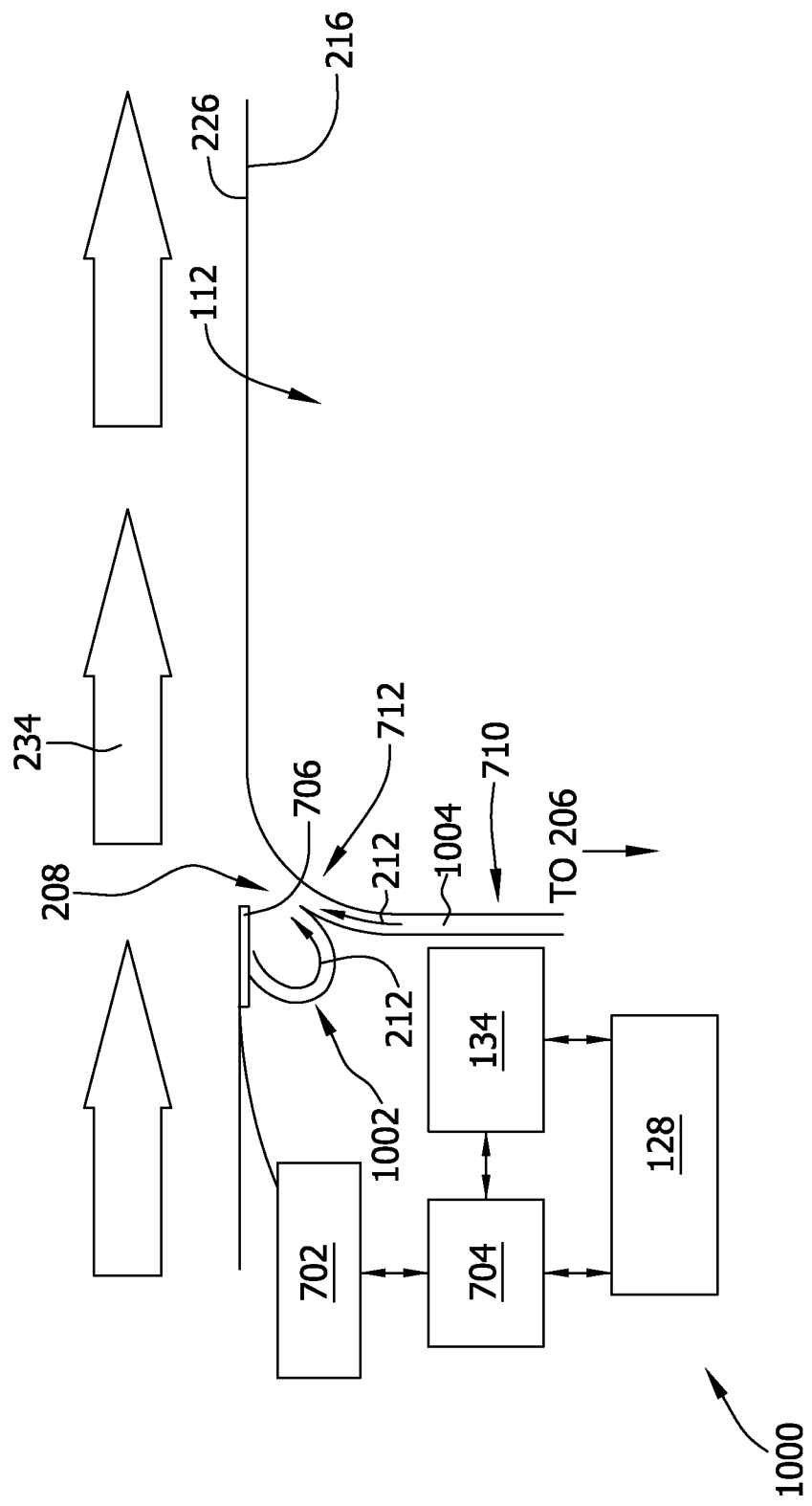

FIG. 12 is a schematic view of a first alternative aperture control system 1000 that may be used with active flow control systems 200, 300, 400, 500, and/or 600 (shown in FIGS. 2-7). Aperture control system 1000 is substantially similar to aperture control system 700 (shown in FIG. 8), except aperture control system 1000 includes a chamber 1002. As such, components shown in FIG. 12 are labeled with the same reference numbers used in FIG. 8.

In the exemplary embodiment, aperture control system 1000 includes a capillary 1004 having chamber 1002 positioned along curved portion 712. Alternatively, aperture control system 1000 includes chamber 1002 but does not include capillary 1004. In the exemplary embodiment, chamber 1002 is configured to impart a rotation and/or direction to AFC air flow 212 before AFC air flow 212 is discharged through aperture 208. More specifically, chamber 1002 is configured to discharge AFC air flow 212 in a predetermined direction with respect to outer air flow 234. In the exemplary embodiment, aperture control system 1000 is used when actuator 702 is a micro actuator; however, it should be understood that aperture control system 1000 can be used with any suitable actuator 702, such as actuator 800 (shown in FIG. 9) and/or actuator 900 (shown in FIG. 11). In actuator control system 1000, a separate chamber 1002 is defined at each aperture 208. Alternatively, an elongated, common chamber 1002 can extend along inner surface 216 of blade 112 adjacent a plurality of apertures 208. As such, chamber 1002 can extend in a longitudinal direction or a chordwise direction along blade 112. In a particular embodiment, discreet and elongated chambers 1002 are included within the same actuator control system 1000. In the exemplary embodiment, chamber 1002 can have any suitable size and shape depending on actuator type, position of aperture 208 with respect to blade 112, and/or any other suitable factors.

Figure 13:
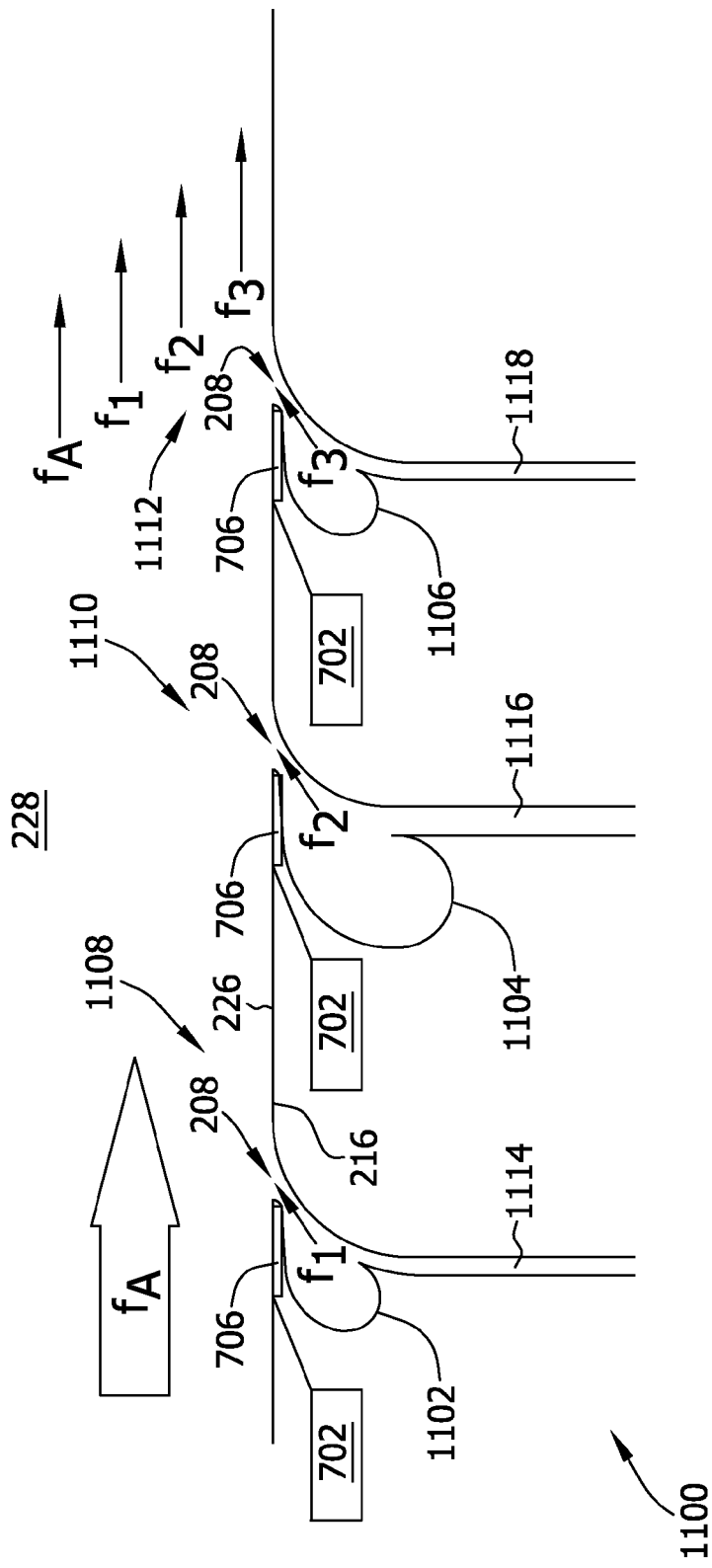

FIG. 13 is a schematic view of a second alternative aperture control system 1100 that may be used with active flow control systems 200, 300, 400, 500, and/or 600 (shown in FIGS. 2-7). Aperture control system 1100 is substantially similar to aperture control system 1000 (shown in FIG. 12), except aperture control system 1100 includes a plurality of different chambers 1102, 1104, and 1106. As such, components shown in FIG. 13 are labeled with the same reference numbers used in FIG. 12.

In the exemplary embodiment, three rows 1108, 1110, and 1112 of apertures 208 are controlled by aperture control system 1100. Alternatively, apertures 208 are each within the same row. In the exemplary embodiment, aperture control system 1100 includes a capillary 1114 having a first chamber 1102 with a first size and shape, a capillary 1116 having a second chamber 1104 with second size and shape, and a capillary 1118 having a third chamber 1106 with a third size and shape. At least one of first chamber 1102, second chamber 1104, and third chamber 1106 is shaped and/or sized differently than other chambers 1102, 1104, and/or 1106. Each chamber 1102, 1104, and 1106 is shaped and/or sized based on actuator type, position of aperture 208 along blade 112, and/or any other suitable factors. Capillaries 1114, 1116, and/or 1118 are also sized and/or shaped based on actuator type, position of aperture 208 along blade 112, size and/or shape of an associated chamber 1102, 1104, or 1106, and/or any other suitable factors. In an alternative embodiment, capillaries 1114, 1116, and/or 1118 are omitted.

In the exemplary embodiment, ambient air $f_A$ flows over outer surface 226 of blade 112, a first AFC air flow $f_1$ is discharged at a direction imparted to first AFC air flow $f_1$ by first chamber 1102, a second AFC air flow $f_2$ is discharged at a direction imparted to second AFC air flow $f_2$ by second chamber 1104, and a third AFC air flow $f_3$ is discharged at a direction imparted to third AFC air flow $f_3$ by third chamber 1106 to alter lift and/or drag of ambient flow $f_A$.

FIG. 14 is a schematic view of a third alternative aperture control system 1200 that may be used with active flow control systems 200, 300, 400, 500, and/or 600 (shown in FIGS. 2-7). Aperture control system 1200 is substantially similar to aperture control system 700 (shown in FIG. 8), except aperture control system 1200 includes a plurality of capillaries 708 coupled to a common manifold 1202. As such, components shown in FIG. 14 are labeled with the same reference numbers used in FIG. 8. In the exemplary embodiment, manifold 1202 extends in a chordwise direction within blade 112 and apertures 208 are positioned chordwise along manifold 1202. Apertures 208 can be positioned in a chordwise line or in different longitudinal rows. In the exemplary embodiment, capillaries 708 extend between each aperture 208 and manifold 1202. In a particular embodiment, aperture control system 1200 includes at least one chamber 1002 (shown in FIG. 12) positioned along a capillary 1004.

The below-described methods can be used to manufacture and/or operate any of active flow control systems 200, 300, 400, 500, and/or 600 (shown in FIGS. 2-7); however, for clarity, the methods will be described with respect to flow control system 200, unless otherwise noted.

Referring to FIGS. 2, 3, and 8, to manufacture blade 112 including at least a portion of active flow control system 200, at least one aperture 208 is defined through blade 112. Blade 112 can be formed and/or aperture 208 can be defined through blade 112 using any suitable method or technique, such as injection molding. At least one actuator 702 is coupled adjacent aperture 208. In the exemplary embodiment, actuator 702 is coupled at least partially within blade 112. In a particular embodiment, actuator 702 is glued to inner surface 216 of blade 112 adjacent aperture 208. In the exemplary embodiment, actuator 702 is operatively coupled to at least one sensor 134, and actuator 702 is configured to control a flow of air discharged from aperture 208 based on an environmental and/or operational condition sensed or measured by sensor 134.

Further, at least one manifold 206 is defined at least partially within blade 112 and in flow communication with aperture 208 by, for example, injection molding. In the exemplary embodiment, defining manifold 206 can include positioning manifold 206 within blade 112 and coupling manifold 206 to blade 112. Capillary 708 is defined between manifold 206 and aperture 208 by, for example, injection molding. In a particular embodiment, actuator 702 is positioned along capillary 708. Referring to FIGS. 12 and 13, at least one chamber 1002, 1102, 1104, and/or 1106 can be defined within blade 112 adjacent aperture 208 by, for example, injection molding.

Referring to FIGS. 2, 3, and 8, a method of operating flow control system 200 is based on environmental conditions surrounding wind turbine 100 (shown in FIG. 1) and/or operating conditions of wind turbine 100. More specifically, flow control system 200 is operated to distribute AFC air flow based on a load distribution on blades 112 and/or a load on one blade 112 to reduce or alleviate loading of blades 112. As such, flow control system 200 is operated to simulate like axi-symmetric loading conditions. For example, when blade 112 is directed upward and two blades 112 are directed downward, the loads on each blade 112 will be different. Flow control system 200 can be operated to balance the loads on blades 112 when blades 112 are differently loaded to simulate like axi-symmetric loading conditions.

In the exemplary embodiment, control system 128 receives a measurement of a sensed condition from at least one sensor 134. For example, control system 128 receives an angle of attack measurement, a wind speed measurement, a rotations-per-minute measurement, a yaw measurement, a flowrate measurement, a temperature measurement, a humidity measurement, a pressure measurement, a wind direction measurement, and/or any other suitable measurement regarding the environment and/or wind turbine 100. In the exemplary embodiment, control system 128 uses the measurement from sensor 134 to determine a load on at least one blade 112.

Control system 128 controls aperture control system 700 to generate an AFC response based on the measurement from sensor 134. More specifically, control system 128 controls aperture controller 704 to generate an AFC response that reduces a load on at least one blade 112. In the exemplary embodiment, the load-reducing AFC response is generated by actuators 702 controlling a size of at least one aperture 208 to change a flow rate and/or flow direction of AFC air flow 212 discharged from each aperture 208 of flow control system 200. For example, each actuator 702 varies the flow rate and/or the flow direction of a respective AFC air flow 212 by opening, partially opening, partially closing, closing, activating, and/or deactivating stop 706, stop 806 (shown in FIG. 9), lid 802 (shown in FIGS. 9 and 10), and/or vortex generator 902 (shown in FIG. 11). In a particular embodiment when no AFC air flow 212 is discharged from at least one aperture 208, lid 802 is moved to the closed position to seal that aperture 208 and prevent debris from entering air distribution system 202 through aperture 208.

As aperture control system 700 varies the AFC response, sensor 134 continues to measure a condition and transmit the measurement to control system 128 to continue adjusting the AFC response. As such, control system 128 performs a closed-loop control of aperture control system 700 using sensor feedback to reduce loads on blades 112. In the exemplary embodiment, control system 128 can also use the closed-loop control of aperture control system 700 to increase lift on at least one blade 112 with chord reduction. More specifically, as the lift is increased due to AFC flow dynamics, the chord requirement can be reduced to an optimum length, thus, reducing the blade platform and additional mass thereof.

The embodiments described herein provide a flow control system that operates in a closed-loop fashion with sensor feedback. Such closed-loop, feedback operation facilitates increasing an efficiency of a wind turbine by maintaining flow attachment over a blade at high angles of attack, which prevents aerodynamic stall. Further, by controlling an AFC response of each blade, especially an AFC response along a blade span, the flow control system facilitates shedding excess wind loads from the blade. Moreover, the herein-described flow control system facilitates reducing vibration in the blades by selectively increasing or decreasing aerodynamic loads along a blade span. Because the loads of each blade can be controlled using the closed-loop, feedback operation, longer blades that produce more efficient wind turbines can be developed. Additionally, the AFC system can reduce loads on the blades and improve wind turbine performance.

Further, the herein-described aperture control system can be applied to any suitable wind turbine blade without relatively extensive retrofitting. A variety of types of actuators may be used to perform the functions described herein. For example, thermal bimorph actuators, piezoelectric bimorph actuators, as well as any other actuators configured to function as described herein may be used with the aperture control system. In a particular embodiment, an actuator including a shaped memory polymer having a high capacity for elastic deformation (up to 200% in most cases) is used to reduce a cost of the actuator, have a lower density, have a broad range of application temperatures which can be tailored, provide for easier processing, and/or be potential biocompatibility and biodegradability, as compared to shape memory alloys. However, shape memory alloys can be used with the above-described actuators. The aperture control system described herein can control mass flow rates and/or velocity ratios of air through the apertures. For example, the air can be discharged from the apertures at a free stream velocity using the aperture control system.

A technical effect of the systems and methods described herein includes at least one of: (a) measuring at least one of an environmental condition and an operational condition of the wind turbine using a sensor; (b) controlling a size of the aperture based on the measured condition using the actuator associated with the aperture; (c) substantially continuously measuring the at least one of the environmental condition and the operational condition as the flow of air is discharged to provide closed-loop feedback control of the actuator; (d) opening and/or closing the aperture based on the measured condition; (e) moving a stop of the actuator based on the measured condition; (f) moving a lid of the actuator based on the measured condition; and (g) moving a vortex generator of the actuator based on the measured condition.

Exemplary embodiments of an aperture control system for use with a flow control system are described above in detail. The methods and systems are not limited to the specific embodiments described herein, but rather, components of systems and/or steps of the methods may be utilized independently and separately from other components and/or steps described herein. For example, the methods may also be used in combination with other flow control systems and methods, and are not limited to practice with only the flow control systems and methods as described herein. Rather, the exemplary embodiment can be implemented and utilized in connection with many other flow control applications.

Although specific features of various embodiments of the invention may be shown in some drawings and not in others, this is for convenience only. In accordance with the principles of the invention, any feature of a drawing may be referenced and/or claimed in combination with any feature of any other drawing.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. An active flow control system for use with a wind turbine that includes at least one blade having a longitudinal axis and a chord wise axis, said active flow control system comprising:
    an air distribution system at least partially defined within said at least one blade, said air distribution system comprising at least one aperture defined through said at least one blade; and,
    an aperture control system in operational control communication with said air distribution system, said aperture control system comprising:
        a sensor coupled to the wind turbine and configured to measure at least one of an environmental condition and an operating condition of the wind turbine; and
        an actuator at least partially positioned within said at least one blade, said actuator comprising a vortex generator configured to rotate from said at least one blade, beyond the aperture and into an outer air flow over said at least at one blade to control a flow of air discharged through said at least one aperture based on the measurement of said sensor.

2. An active flow control system in accordance with claim 1, wherein said actuator comprises at least one of a shape memory alloy actuator, a piezoelectric mechanism actuator, a shape memory polymer actuator, an optical actuator, a micro optical-actuated electro-mechanical system actuator, a micro-electromechanical system actuator, a flow control valve, a solenoid valve, a butterfly valve nozzle, and a variable area valve.

3. An active flow control system in accordance with claim 1, wherein said actuator comprises a lid configured to seal said at least one aperture.

4. An active flow control system in accordance with claim 1, wherein said air distribution system comprises at least one manifold positioned at least partially within said at least one blade and in flow communication with said at least one aperture, and wherein said aperture control system comprises a capillary extending between said at least one manifold and said at least one aperture.

5. An active flow control system in accordance with claim 4, wherein said capillary comprises a curved portion configured to impart a direction to the flow of air.

6. An active flow control system in accordance with claim 4, wherein said capillary comprises a chamber configured to impart a direction to the flow of air.

7. A method of manufacturing a blade for a wind turbine that includes an active flow control system having an aperture and an actuator, said method comprising:
    defining the aperture through the blade;
    defining at least one manifold at least partially within the blade and in flow communication with the aperture;
    defining a chamber within the blade, adjacent to the aperture and in flow communication with the at least one manifold, the chamber configured to impart a direction to a flow of air from the manifold;
    coupling a sensor to the wind turbine, the sensor configured to measure at least one of an environmental condition and an operational condition of the wind turbine; and,
    coupling an actuator at least partially within the blade, the actuator comprising a vortex generator configured to rotate from the at least one blade, beyond the aperture and into an outer air flow over the at least at one blade to control the flow of air discharged through the aperture based on the measurement of the sensor.

8. A method in accordance with claim 7, wherein coupling an actuator at least partially within the blade comprises coupling at least one of a shape memory alloy actuator, a piezoelectric mechanism actuator, a shape memory polymer actuator, an optical actuator, a micro optical-actuated electromechanical system actuator, a micro-electromechanical system actuator, a flow control valve, a solenoid valve, a butterfly valve nozzle, and a variable area valve adjacent the aperture.

9. A method in accordance with claim 7 further comprising:
    defining at least one manifold at least partially within the blade and in flow communication with the aperture; and,
    defining a capillary between the manifold and the aperture.

10. A method for operating an active flow control system that is at least partially defined within a blade of a wind turbine, the active flow control system including an aperture defined through the blade and an actuator associated with the aperture, said method comprising:
    measuring at least one of an environmental condition and an operational condition of the wind turbine using a sensor;
    controlling a size of the aperture based on the measured condition using the actuator associated with the aperture; and,
    moving a vortex generator beyond the aperture and into an outer air flow of the blade.

11. A method in accordance with claim 10, wherein measuring at least one of an environmental condition and an operational condition further comprises substantially continuously measuring the at least one of the environmental condition and the operational condition as the flow of air is discharged to provide closed-loop feedback control of the actuator.

12. A method in accordance with claim 10, wherein controlling a size of the aperture further comprises one of opening and closing the aperture based on the measured condition to change at least one of a flow rate and a flow direction of air discharged from the aperture.

13. A method in accordance with claim 10, wherein controlling a size of the aperture further comprises moving a stop of the actuator based on the measured condition.

14. A method in accordance with claim 10, further comprising moving a lid of the actuator based on the measured condition.

* * * * *